Figure 1A:
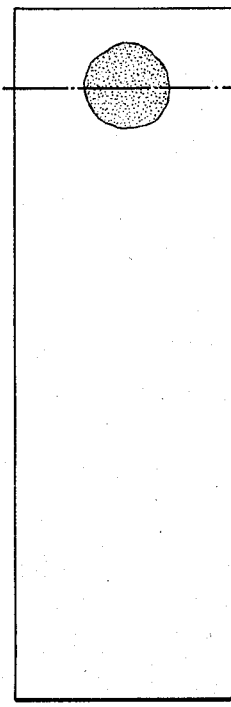

Sept. 20, 1960 J. GEDEON ET AL 2,953,597
CRYSTALLINE WATER-SOLUBLE CONDENSATION PRODUCT
AND PROCESS OF MAKING SAME
Filed Feb. 18, 1958 2 Sheets-Sheet 1

INVENTORS
JOSEPH GEDEON
KARL BOLZ
BY
AGENT

United States Patent Office 2,953,597
Patented Sept. 20, 1960

2,953,597

CRYSTALLINE WATER-SOLUBLE CONDENSATION PRODUCT AND PROCESS OF MAKING SAME

Joseph Gedeon and Karl Bolz, Konstanz, Bodensee, Germany, assignors to Byk-Gulden Lomberg Chemische Fabrik G.m.b.H., Konstanz, Bodensee, Germany, a corporation of Germany Filed Feb. 18, 1958, Ser. No. 715,922

Claims priority, application Germany Feb. 22, 1957

6 Claims. (Cl. 260—512)

The present invention relates to a crystalline water soluble tanning compound, and more particularly, to a crystalline water-soluble condensation product of m-cresol sulfonic acid and formaldehyde, having valuable therapeutical properties, and a process of making same.

The production of compounds with tanning properties by condensation of cresol sulfonic acids and formaldehyde is known for a long time. But the known processes do not yield a uniform product which can be isolated from the reaction mixture in form of pure crystals. The known processes resulted merely in solutions which contained several condensation products with tanning properties. This is due to the fact that a technical cresol, i.e. a mixture of o-, m-, and p-cresol was used as starting material. In one of the known processes the reaction components, i.e. the sulfonated cresol and formaldehyde, were used in a molar ratio of 3:1. Even when condensing sulfonated m-cresol with formaldehyde in a molar ratio 3:1, a solution of several products was obtained. Such a solution contains not only the condensation product with tanning compound but also unreacted m-cresol sulfonic acid and a number of lower condensation products as has been proved by chromatographic paper analysis. When testing the condensation product for its tanning properties according to the skin powder method described in "Gerbereichemisches Taschenbuch" by Kuentzel, 1955, page 205, it was found that only 60% to 70% of tanning compounds calculated for the analytically determined content of condensation products are contained therein.

It is also very difficult to remove the last traces of sulfuric acid when working according to the known processes. The composition of the condensation products is not always the same even when operating under exactly the same reaction conditions.

It is one object of the present invention to provide a new crystalline water-soluble tanning compound having valuable therapeutic properties.

Another object of the present invention is to provide a simple and effective process of making such tanning compounds.

Other objects of the present invention and advantageous features thereof will become apparent as the description proceeds.

In principle, the tanning compound according to the present invention represents a condensation product of m-cresol sulfonic acid and formaldehyde. Said tanning compound corresponds to the formula The crystalline water-soluble tanning compound according to the present invention is obtained by sulfonation of m-cresol with concentrated sulfuric acid, dilution of the reaction mixture with water to a sulfuric acid concentration between 30% and 70%, preferably to a concentration between 55% and 65%, and condensation of the dissolved crude m-cresol sulfonic acid with formaldehyde in a molar ratio of 1:1 in such a strongly acid medium at a low temperature, preferably at a temperature between 20° C. and 40° C. As soon as the condensation reaction is completed, the mixture is poured into concentrated hydrochloric acid. Thereby the condensation product is precipitated in the form of crystals. After decanting the supernatant mother liquor, the crystals are stirred with a halogenated aliphatic hydrocarbon, for instance, with chloroform, filtered with suction, washed several times with the halogenated hydrocarbon and dried in an air cussent. In this manner the last traces of inorganic acids adhering thereto are easily removed from the resulting condensation product. Paper chromatographic analysis shows that a uniform condensation product is obtained.

When using 20% oleum, i.e. concentrated sulfuric acid containing 20% of sulfuric acid anhydride according to known processes and technical grade m-cresol, condensation of the resulting crude m-cresol sulfonic acid with formaldehyde in a molar ratio of 1:1 results in solidification of the entire reaction mixture. A crystalline condensation product cannot be isolated therefrom. When operating at a higher temperature than between 20° C. and 40° C., for instance, at a temperature of about 100° C. considerable amounts of insoluble resinous products are formed in the course of the condensation reaction. Furthermore, the process according to the present invention is considerably simplified insofar as it is no more necessary to remove excess sulfuric acid by means of its alkaline earth metal salts, for instance, barium sulfate, and to concentrate the resulting dilute filtrate in order to remove excess water and unreacted m-cresol.

It is quite surprising and could not be foreseen that the process according to the present invention yields a uniform crystalline pure final product containing at least 90% of tanning components in a yield of 80% calculated for m-cresol used as starting material. Heretofore, no solid product has been obtained. Furthermore, it is also surprising that under the reaction conditions of the process according to the present invention the sulfo groups of about one half of the m-cresol sulfonic acid subjected to condensation with formaldehyde are split off. The final product is not only free of inorganic sulfur but it also contains only in each second benzene ring a sulfonic acid group as is shown by elementary analysis and confirmed by determination of the equivalent weight. According to Kuentzel "Colloquiumsberichte des Institutes fuer Gerbereichemie der Technischen Hochschule Darmstadt," number 5, page 27, the smaller the degree of sulfonation of a synthetic tanning compound, the better is its tanning effect.

According to another embodiment of the process according to the present invention, pure m-cresol sulfonic acid which is readily obtained, can be used as starting material for the condensation reaction in place of the solution obtained by sulfonating m-cresol with concentrated sulfuric acid. When reacting such a pure acid, the yield is practically quantitative. Formaldehyde is preferably also employed in a molar ratio 1:1. An excess of form-

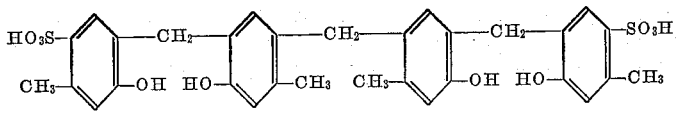

aldehyde must be avoided since it results in the formation of insoluble resinous products. When using an excess of m-cresol sulfonic acid the same condensation product is precipitated; however, the yield calculated for m-cresol sulfonic acid, is lower.

The crystalline water-soluble condensation product obtained by the process according to the present invention is an excellent tanning agent. It also shows excellent therapeutic activity in the treatment of skin diseases and diseases of the mucous membranes caused by microbes. The product is free of mineral acids and unreacted m-cresol sulfonic acid and, therefore, does not irritate skin or mucous membranes. It does not precipitate albumin.

The condensation product according to the present invention is characterized by its ultraviolet absorption spectrum which shows a maximum spectrum. Its infrared absorption spectrum does not show maxima at 1250 cm.$^{-1}$ and at 870 cm.$^{-1}$ indicating that no ether bonds are present in the molecule.

The number of phenolic hydroxyl groups has not been changed during the reaction as can be proved by determining the phenolic hydroxyl groups by acetylation.

The tanning compound according to the present invention forms alkali metal salts, alkaline earth metal salts, and a crystalline pyridinium salt which melts between 220° C. and 230° C. with decomposition.

After acetylation of the phenolic hydroxyl groups, the resulting acetylated tanning compound forms a pyridinium salt which melts at 185–195° C.

The viscosity of aqueous solutions of the tanning compound according to the present invention is as follows:

Content of solution: Viscosity
8.62% _____ 1.67 centipoise 20° C.
25.86% _____ 5.86 centipoise 20° C.
43.10% _____ 342.56 centipoise 20° C.

The tanning compound according to the present invention is furthermore characterized by the following tanning properties:

Content of tanning compound calculated for dry substance _____ percent__ 92.7
Binding number, i.e. amount of product irreversibly bound by 100 g. of skin powder determined according to Kuentzel l.c. _____ 21.0
Tanning value, i.e. amount bound by 100 g. of skin powder:
After 3 hours _____ 25.7
After 24 hours _____ 32.5

It is not possible to give corresponding data with respect to the known compounds since they were not uniform and did not crystallize. The amount of tanning component in the known compound calculated for dry substance is about 60–65%.

The following examples serve to illustrate the present invention without, however, limiting the same thereto.

Example 1

500 g. of m-cresol (4.62 mols) are heated with 600 g. of concentrated sulfuric acid at 120° C. for 2 hours. After cooling, the reaction mixture is poured into 300 cc. of ice-water. The content of the resulting aqueous solution of m-cresol sulfonic acid is determined by analysis as amounting to 755 g. (4 mols). Small amounts of sulfones which might have been formed as by-product, are filtered off. 300 cc. of a 40% aqueous solution of formaldehyde are slowly added to the filtrate while stirring vigorously. Thereby, the temperature is kept below 45° C. After addition of the formaldehyde, the temperature of the reaction mixture is kept at 40° C. As soon as the odor of formaldehyde has disappeared, the mixture is poured into about twice its volume of concentrated hydrochloric acid while stirring vigorously. The condensation product is precipitated. It settles rapidly. The supernatant liquid is decanted. The precipitated product is covered with a layer of chloroform and is stirred thoroughly therewith. The crystals are filtered with suction, washed two to three times with chloroform, and dried in a current of air. 550 g. of a reddish powder are obtained. The yield is 90% of the theoretical yield calculated for m-cresol sulfonic acid and 78% of the theoretical yield calculated for m-cresol used as starting material. The equivalent weight of the final product is determined as being 297 while the calculated equivalent weight for dihydroxy dimethyl diphenyl methane monosulfonic acid is 307. The elementary analysis shows 9.3% of sulfur while the calculated sulfur content is 10.4%.

Example 2

188 g. of pure crystalline 3-hydroxy toluene-6-sulfonic acid (1 mol) are dissolved in 80 cc. of water. 75 cc. of a 40% aqueous formaldehyde solution (1 mol) are added while the temperature is kept below 45° C. The reaction mixture is heated at 40° C. for 10 hours. Thereafter, the formaldehyde odor has disappeared. The viscous reaction mixture is poured into about twice its volume of concentrated hydrochloric acid. The precipitate is worked up as described hereinabove in Example 1. 150 g. of the condensation product are obtained. The yield is 98.5% of the theoretical yield. The equivalent weight of the product is 310 (calculated 304). Its sulfur content is 10.8% (calculated 10.4%).

The crystalline condensation product according to the present invention is useful not only as tanning agent but, due to its high purity, it is also an effective therapeutic agent which finds application as medicament to promote healing of diseased tissue. It has the great advantage over the known non-crystalline condensation products as they have been produced heretofore that it does not precipitate albumin and proteins. As a result thereof it can be applied without danger as antibacterial agent to the skin and to mucous membranes. Since it contains neither free mineral acid nor unreacted m-cresol sulfonic acid, it is not irritating.

The attached drawings illustrate the purity and uniformity of the condensation product obtained according to the present invention. In these drawings Fig. 1a illustrates the paper chromatogram of the condensation product according to the present invention, while Fig. 1b illustrates the paper chromatogram of a condensation product obtained according to the known process at a temperature between 50° C. and 65° C. and with a molar proportion of about 2.7 mols of m-cresol sulfonic acid to 1 mol of formaldehyde.

Figure 2:
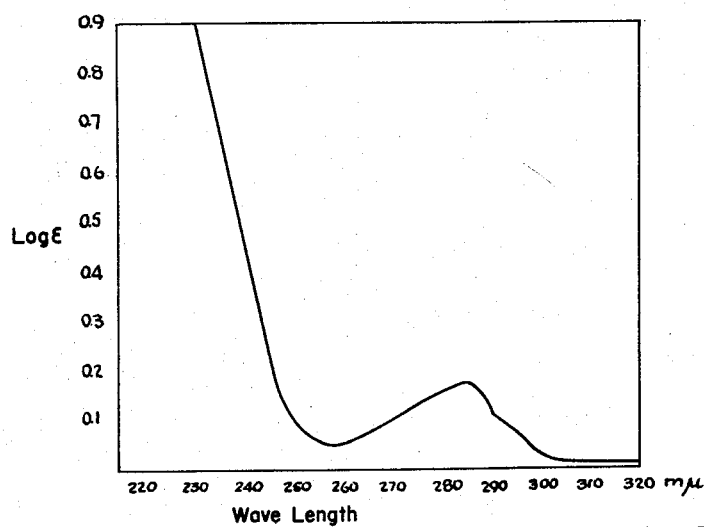

Fig. 2 illustrates the ultraviolet absorption spectrum, and

Figure 3:
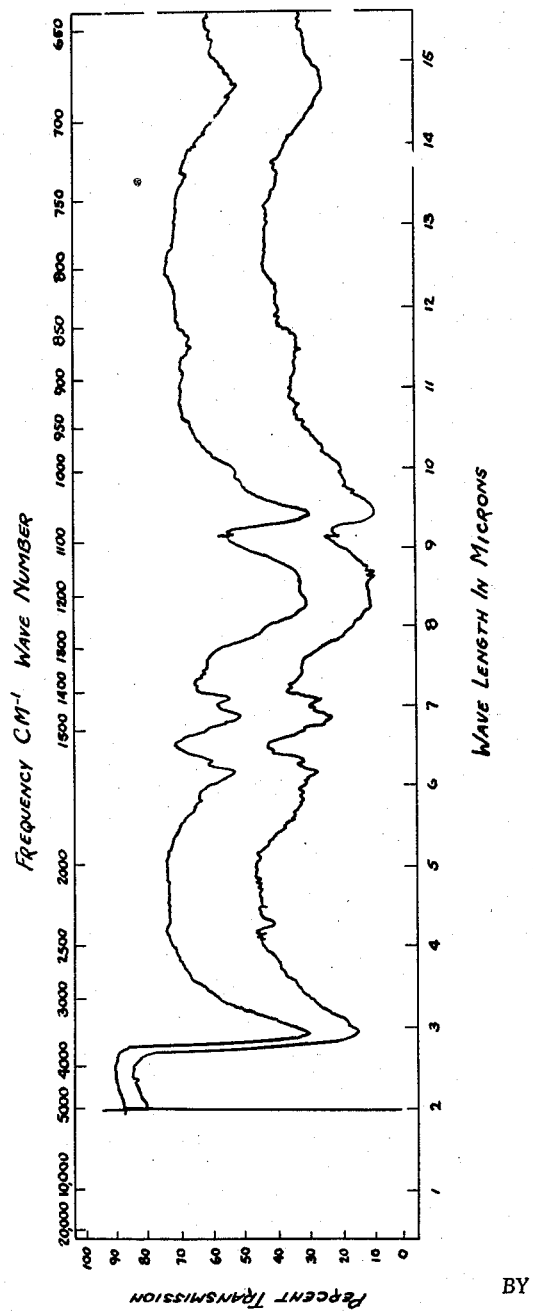

Fig. 3 the infrared absorption spectrum of the condensation product according to the present invention.

Figure 1B:
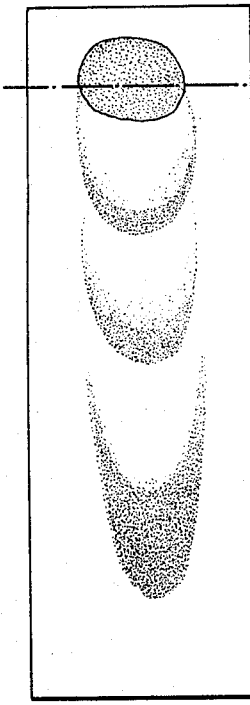

The paper chromatograms of Figs. 1a and 1b are developed by using butanol, acetic acid and water as solvent and by a treatment with FeCl$_3$ solution.

It is evident that the condensation product obtained according to the known process consists of a number of substances while the process according to the present invention yields substantially one single spot indicating that a specific condensation product is obtained.

The ultraviolet absorption spectrum is determined in a 20 γ/ml. water solution of the condensation product, the infrared spectrum in KBr (1.73 mg./200 mg. KBr).

The pure 3-hydroxy toluene sulfonic acid used as starting material in Example 2 is prepared by sulfonating 200 g. of pure m-cresol with 240 g. concentrated sulfuric acid at a temperature of 120° C. for 2 hours. The reaction mixture is poured into 85 cc. of water. On allowing the diluted reaction mixture to stand, pure 3-hydroxy toluene sulfonic acid crystallizes from the aqueous solution. It is filtered off by suction and washed with 20 cc. of ice water. The acid is dried in an air current.

The alkali metal, alkaline earth metal, and pyridinium salts of the new condensation product are prepared by adding to a concentrated aqueous or alcoholic solution of the crystalline condensation product the equivalent amounts of alkali metal hydroxides or carbonates, alkaline earth metal hydroxides or carbonates, or pyridine until the mixture is rendered neutral. The resulting solutions are then concentrated by evaporation and the respective salts are allowed to crystallize.

Acetylation of the phenol groups is effected in a manner known per se, for instance, with acetylchloride or acetic acid anhydride. The resulting acetylated condensation product is converted into its pyridinium salt by neutralization of its concentrated aqueous solution with pyridine and concentration by evaporation of the neutralized solution until crystallization sets in.

The aqueous solution of the alkali metal salts of the new condensation products have also proved to be useful for tanning and therapeutic purposes.

We claim:

1. In a process of producing a water-soluble, crystalline, and uniform condensation product, the steps comprising heating m-cresol and concentrated sulfuric acid at a temperature between 100° C. and 120° C., for a time between about 2 and about 3 hours, pouring the sulfonation mixture into ice-water in an amount sufficient to yield an aqueous solution containing between about 30% and about 70% of m-cresol sulfonic acid, adding to said aqueous solution formaldehyde in a molar ratio of m-cresol sulfonic acid to formaldehyde of about 1:1 at a temperature below 45° C., heating the reaction mixture at a temperature between about 20° C. and about 45° C. until condensation is completed, pouring the condensation mixture into concentrated hydrochloric acid, and isolating the resulting precipitated condensation product.

2. The process according to claim 1, wherein the precipitated condensation product is washed with a halogenated aliphatic hydrocarbon to remove adhering inorganic acids and by-products and wherein the washed condensation product is dried in an air current.

3. In a process of producing a water-soluble, crystalline, and uniform condensation product, the steps comprising adding to an aqueous solution of crude m-cresol sulfonic acid formaldehyde in a molar ratio of m-cresol sulfonic acid to formaldehyde of about 1:1 at a temperature below 45° C., heating the reaction mixture at a temperature between about 20° C. and about 45° C. until condensation is completed, pouring the condensation mixture into concentrated hydrochloric acid, and isolating the resulting precipitated condensation product.

4. In a process of producing a water-soluble, crystalline, and uniform condensation product, the steps comprising heating m-cresol and concentrated sulfuric acid at a temperature between 100° C. and 120° C., for a time between about 2 and about 3 hours, pouring the sulfonation mixture into ice-water in an amount sufficient to yield an aqueous solution containing between about 55% and about 65% of m-cresol sulfonic acid, adding to said aqueous solution formaldehyde in a molar ratio of m-cresol sulfonic acid to formaldehyde of about 1:1 at a temperature below 45° C., heating the reaction mixture at a temperature between about 20° C. and about 45° C. until condensation is completed, pouring the condensation mixture into concentrated hydrochloric acid, and isolating the resulting precipitated condensation product.

5. The water-soluble, crystalline, and uniform condensation product of m-cresol sulfonic acid and formaldehyde of the formula

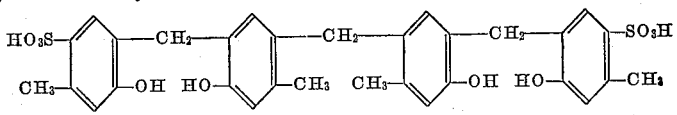

said compound forming a crystalline pyridinium salt having a melting point between about 220° C. and about 230° C., the crystalline pyridinium salt of its acetylation product having a melting point between about 185° C. and about 195° C., said condensation product being free of mineral acid and unreacted m-cresol sulfonic acid and being substantially non-irritating to skin and mucous membranes.

6. In a process of producing a water-soluble, crystalline, and uniform condensation product, the steps which comprise adding formaldehyde to an aqueous solution containing between about 30% and about 70% of substantially pure m-cresol sulfonic acid in a molar ratio of m-cresol sulfonic acid to formaldehyde of about 1:1 at a temperature below 45° C., heating the reaction mixture at a temperature between about 20° C. and about 45° C. until condensation is completed, pouring the condensation mixture into concentrated hydrochloric acid, and isolating the resulting precipitated condensation product.

References Cited in the file of this patent
UNITED STATES PATENTS

| | | |
|---|---|---|
| 1,237,405 | Stiasny | Aug. 21, 1917 |
| 2,230,564 | Gasnier | Feb. 4, 1941 |
| 2,326,578 | Thuau | Aug. 10, 1943 |